July 21, 1970 YOSHIHISA KAMEOKA 3,521,151

MODULATOR HAVING LINEARIZED INPUT-OUTPUT CHARACTERIC AND SEPARATE D.C. AND A.C. OUTPUTS

Filed May 3, 1968

INVENTOR.
YOSHIHISA KAMEOKA
BY
A. C. Smith
ATTORNEY

United States Patent Office 3,521,151
Patented July 21, 1970

3,521,151

MODULATOR HAVING LINEARIZED INPUT-OUTPUT CHARACTERISTIC AND SEPARATE D.C. AND A.C. OUTPUTS

Yoshihisa Kameoka, Tokyo, Japan, assignor to Yokogawa-Hewlett-Packard, Ltd., Tokyo, Japan, a corporation of Japan Filed May 3, 1968, Ser. No. 726,317
Claims priority, application Japan, July 18, 1967, 42/61,652
Int. Cl. H03c *5/00*
U.S. Cl. 332—16 5 Claims

ABSTRACT OF THE DISCLOSURE

A modulator circuit receives an AC signal at the emitter input circuit of a transistor and receives a DC signal at the base input circuit and produces at the collector output circuit a DC output and an AC output representative of the DC input signal. The collector output circuit includes a compensating circuit which utilizes the forward characteristic of a diode.

SUMMARY OF THE INVENTION

In the present invention, the nonlinear relationship between the DC and AC outputs obtained at the collector output circuit of the transistor modulator circuit is compensated for by serially connecting the DC and AC outputs in the collector circuit of the transistor and by inserting in parallel with the DC output circuit a compensating circuit which utilizes the forward characteristic of the diode. A modulator circuit of this type is useful in ohmmeter circuits as described in pending patent application Ser. No. 722,847, entitled Ohmmeter Having Indication Stabilizing Circuit, filed on Apr. 22, 1968, by Haruo Ito.

DESCRIPTION OF THE PREFERRED EMBODIMENT

Figure 1:
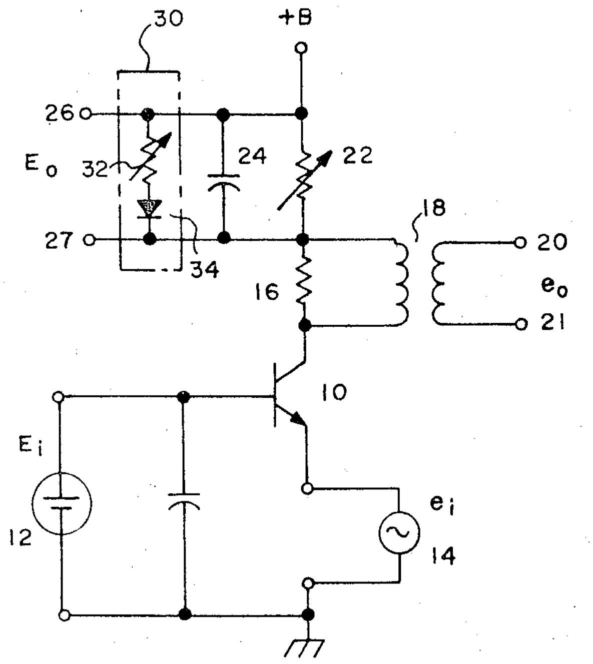
FIG. 1 is a circuit diagram of the preferred embodiment of this invention and FIG. 2 is a graph showing the output characteristics of the circuit of FIG. 1.

Referring to FIG. 1, DC signal source 12 is connected to the base input circuit of transistor 10, and AC signal source 14 is connected to the emitter input circuit. Resistance elements 16 and 22 are serially connected between one terminal of a bias supply and the collector output circuit of said transistor 10. The primary winding of transformer 18 is connected between the two end terminals of resistance element 16 and the AC output terminals 20 and 21 are connected to the secondary winding of transformer 18. Capacitor 24 and compensating network 30 are connected in parallel between the two end terminals of resistance element 22. The compensating circuit 30 comprises resistance element 32 and diode 34 serially connected between the DC output terminals 26 and 27 which are connected to the two end terminals of resistance element 22.

Referring to the two outputs at the collector of transistor 10 which are produced in response to the two input signals $E_i$ and $e_i$ supplied, respectively, by the DC signal source 12 and AC signal source 14, the AC voltage amplification factor $A_v$ between the emitter and the collector of transistor 10 may be expressed as follows:

$$A_v=\frac{\beta R_{AC}}{r_b+(1+\beta)r_e} \quad (1)$$

where $r_b$ is the base resistance of transistor 10, $r_e$ is the emitter resistance, $R_{AC}$ is the resistance value of resistance element 16, and $\beta$ is the current gain parameter of transistor 10. Also, the relationship between the DC voltage $E_i$ applied to the base of transistor 10 and the DC current $I_c$ that flows in the collector can be expressed by the following formula:

$$I_c=\alpha I_e=\alpha I_s\left(\epsilon^{\frac{qE_i}{kT}}-1\right) \quad (2)$$

where $\alpha$ is current transmission parameter of transistor 10, $I_e$ is emitter current, $I_s$ is reverse saturation current, $k$ is Boltzmann's constant, T is absolute temperature, and $q$ is electric charge. Thus, AC output $e_o$ can be expressed as a function of inputs $E_i$ and $e_i$ by the following formula:

$$e_o=A_v\times e_i \quad (3)$$

An approximate formula by substituting Formula 1 in the above Formula 3 assuming that $\beta\gg1$ (namely $\alpha\cong1$) is as follows:

$$e_o=\frac{R_{AC}}{r_e}\times e_i \quad (4)$$

Further, when the following conditions are added, $$r_e\cong\frac{kT}{qI_e} \text{ and } I_e\cong I_c \quad (5)$$

the above Formula 4 may be expressed by the following Formula 6.

$$e_o=K_1\left(\epsilon^{\frac{qE_i}{kT}}-1\right)e_i \quad (6)$$

where $$K_1=I_s\frac{qR_{AC}}{kT}$$

Thus, AC output $e_o$ varies in correspondence to the product of DC input $E_i$ and AC input $e_i$, assuming that the turns ratio of transformer 18 is unity.

Further, DC output $E_o$ will be $$E_o=R_{DC}\times I_c=R_{DC}\times I_s\left(\epsilon^{\frac{qE_i}{kT}}-1\right) \quad (7)$$

where $R_{DC}$ is the resistance value of resistance element 22 (with the compensating circuit 30 removed). Thus, $E_o$ has no relation with the variation of $e_i$.

Figure 2:
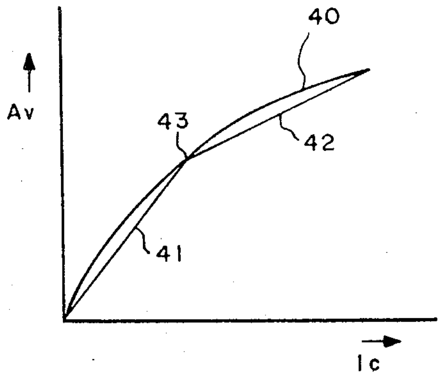

The two outputs $E_o$ and $e_o$ will vary in relation to the change of DC input $E_i$ in the following manner. Assume that the amplitude and frequency of the AC signal $e_i$ are constant. The above Formulas 6 and 7 for the modulator circuit without the compensating circuit 30 may be rearranged (when the current gain parameter $\beta$ of transistor 10 is sufficiently great in comparison with (1)) as follows:

$$e_o=K_2\left(\epsilon^{\frac{qE_i}{kT}}-1\right) \quad (8)$$

$$E_o=K_3\left(\epsilon^{\frac{qE_i}{kT}}-1\right) \quad (9)$$

where $K_2$ and $K_3$ are constants. Therefore, each of the two outputs $e_o$ and $E_o$ vary in linear relationship to the DC input $E_i$. However, when DC current $I_c$ is close to zero, the current gain parameter $\beta$ of transistor 10 will not always be sufficiently greater than 1, above Formulas 8 and 9 will not be consistent, and consequently $e_o$ and $E_o$ will depart from the linear relationship. For example, when current $I_c$ is 0–500 $\mu$a., the AC amplication factor $A_v$ and the DC current $I_c$ (these correspond respectively to AC output $e_o$ and DC output $E_o$) exhibit non-linear characteristics, as shown by curve 40 of FIG. 2.

Therefore, in this invention, in order that $E_o$ and $e_o$ may be in a linear relationship even when the DC current $I_c$ is close to zero, the compensating circuit 30 comprising silicon diode 34 is connected between DC output terminals 26 and 27. This alters the non-linear characteristic 40, as shown by the piecewise linear curves 41 and 42, in response to the threshold values of the forward voltage and current characteristic of said diode 34. The resistance element 22 determines the slope of curve 41 and adjusts the linearity and the resistance element 32 adjusts the full scale, and the combined resistance value of resistance element 32, the forward operating resistance of diode 34, and the resistance element 22 determines the slope of curve 42. The cusp 43 of the curves 41 and 42 represents the threshold value of forward conduction voltage drop of silicon diode 34. Thus, it should be noted from the foregoing description that the non-linear relationship between the DC and AC outputs and the DC input signal is improved by the compensating circuit 30 of this invention.

I claim:

1. A modulator circuit comprising:
a gain element having input means and an output for providing signal gain between the input means and output that is greater than unity;
means connected to the input means of said gain element for applying thereto a unidirectional signal and an alternating signal of selected frequency;
a first output circuit means having a first pair of output terminals for supplying alternating signal at said selected frequency and second output circuit means having a second pair of output terminals for supplying unidirectional signal; and
means serially connecting the first and second output circuit means to the output of said gain element for supplying on said first pair of output terminals an alternating signal at said selected frequency and at an amplitude that varies with the unidirectional signal applied to said input means and for supplying on said second pair of output terminals a unidirectional signal at an amplitude that varies with the unidirectional signal applied to said input means.

2. A modulator circuit as in claim 1 comprising a compensating network including a semiconductor diode connected across the output terminals of said second output circuit.

3. A modulator circuit comprising:
a gain element having input means and an output for providing signal gain between the input means and output that is greater than unity;
means connected to the input means of said gain element for applying thereto a unidirectional signal and an alternating signal of selected frequency;
first output circuit means having a first pair of output terminals for supplying alternating signal at said selected frequency, said first output circuit means including a first resistance element and a transformer having a secondary winding connected to said first pair of output terminals and having a primary winding connected across said first resistance element;
second output circuit means having a second pair of output terminals for supplying unidirectional signal, said second output circuit means includes a second resistance element and means connecting said second pair of output terminals across said second resistance element; and
means serially connecting the first and second resistance elements of said first and second output circuit means to the output of said gain element.

4. A modulator circuit as in claim 3 comprising:
a compensating network connected across said second pair of output terminals and including serially connected semiconductor diode and third resistance element.

5. A modulator circuit as in claim 4 wherein at least one of said second and third resistance elements is variable.

References Cited

UNITED STATES PATENTS

| | | | |
|---|---|---|---|
| 3,026,423 | 3/1962 | Tedeschi et al. ---- | 307—295 X |
| 3,065,432 | 11/1962 | Duncan. | |

ALFRED L. BRODY, Primary Examiner

U.S. Cl. X.R.

307—295; 332—17, 18, 37